(12) United States Patent
Meghelli

(10) Patent No.: US 7,286,569 B2
(45) Date of Patent: Oct. 23, 2007

(54) FULL-RATE CLOCK DATA RETIMING IN TIME DIVISION MULTIPLEXERS

(75) Inventor: Mounir Meghelli, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 1230 days.

(21) Appl. No.: 10/314,052

(22) Filed: Dec. 6, 2002

(65) Prior Publication Data

US 2004/0109420 A1 Jun. 10, 2004

(51) Int. Cl.
*H04J 3/06* (2006.01)

(52) U.S. Cl. ...................................... 370/518; 370/535

(58) Field of Classification Search ............... 370/516, 370/503, 518, 535
See application file for complete search history.

(56) References Cited

U.S. PATENT DOCUMENTS 5,301,196 A * 4/1994 Ewen et al. ................ 370/518

OTHER PUBLICATIONS

Y. Nakasha et al., "A 43 Gb/s Full-Rate-Clock 4:1 Multiplexer in InP-based HEMT Technology" International Solid-State Circuit Conference Digest, 3 pages, 2002.

* cited by examiner

*Primary Examiner*—John Pezzlo
(74) *Attorney, Agent, or Firm*—Anne V. Dougherty; Ryan, Mason & Lewis, LLP

(57) ABSTRACT

Apparatus for use in providing full-rate clock data retiming in a time division multiplexer, wherein the time division multiplexer includes an N to 1 time division multiplexer circuit and a retiming circuit, comprises the following circuitry. The apparatus comprises first circuitry for generating a half-rate clock from a full-rate clock used by the retiming circuit and for providing selective adjustment of a phase associated with the half-rate clock within a range of D degrees. The apparatus further comprises second circuitry, coupled to the first circuitry, for generating a set of sub-rate clocks from the phase-adjustable half-rate clock for use by the N to 1 time division multiplexer circuit in generating a multiplexed data stream from N parallel data streams, such that the retiming circuit is able to operate within a clock phase margin associated therewith. Phase adjustment need not be dependent on a rate associated with the multiplexed data stream, and may be continuous or discrete. When D is 180°, the retiming circuit is effectively able to operate with a clock phase margin of 360°.

27 Claims, 3 Drawing Sheets

FULL-RATE CLOCK DATA RETIMING IN TIME DIVISION MULTIPLEXERS

FIELD OF THE INVENTION

The present invention relates to the field of Time Division Multiplexing (TDM) transmission systems and, more particularly, to full-rate clock data retiming in time division multiplexer circuits.

BACKGROUND OF THE INVENTION

A TDM transmitter multiplexes, in the time domain, several low speed parallel data channels into a single high speed serial data stream, referred to as the multiplexed data stream. The multiplexing operation uses a local high frequency clock signal synthesized from a local low frequency reference clock. The high speed serial data stream is then transmitted through a single transmission medium such as a coaxial cable or an optical fiber. Circuits used to perform the multiplexing operation in the time domain are commonly known as time division multiplexer circuits, or time division multiplexers.

Time division multiplexers are also used in test equipment, generally to generate high speed pseudo-random bit streams for laboratory evaluation of circuits and transmission systems. Usually, time division multiplexers used in TDM transmission systems operate at a single data rate, while those used in test equipment are preferably frequency agile.

When the multiplexed data are Non-Return-to-Zero (NRZ) coded, the local clock signals, used to perform the different data time multiplexing operations, have frequencies equal to sub-rates of the serial data and the highest clock frequency required is equal to half the serial data rate. When the highest frequency of the local clock signal is equal to half the serial data rate, time division multiplexers are known as half-rate clock time division multiplexers.

Half-rate clock time division multiplexers have a major drawback related to the duty cycle distortion of the half-rate clock, which directly impacts the multiplexed data duty cycle distortion, which in turn may significantly degrade the quality of a transmission.

Consequently, a full-rate local clock (meaning that the clock frequency is equal to the multiplexed data rate) retiming circuit is often used as a final stage of the time division multiplexer to suppress the multiplexed data duty cycle distortion due to the half-rate clock duty cycle distortion. The full-rate clock retiming circuit processes the multiplexed data using a single edge of the full-rate clock whereas the final multiplexing operation uses both edges of the half-rate clock. Thus, as opposed to the half-rate clock, the duty cycle distortion of the full-rate clock will not affect the data. On the other hand, the multiplexed data jitter accumulated during the multiplexing operation is being "reset" by the full-rate clock retiming circuit since all the sub-rate clocks are derived from the full-rate clock (assuming that the retiming circuit features a low enough jitter generation).

But time division multiplexers using a final full-rate clock retiming stage present a major difficulty in the form of time alignment between the full-rate clock and the multiplexed data. This alignment is strongly dependent on the propagation delay of the various building blocks of the time division multiplexer. The full-rate clock used to sample the multiplexed data in the final retiming circuit is also the clock used to derive the sub-rate clocks required for multiplexing the parallel data channels. The delay from the time the full-rate clock is divided to create the half-rate clock to the time the multiplexed data are presented to the final retiming stage input needs to be small enough (usually smaller than one full-rate clock period) for the retiming circuit to operate within its clock phase margin region, otherwise transmission errors will occur. This alignment issue is becoming more critical as the transmission data rate is rapidly increased, thus reducing the safe operating margins of the highest speed circuits in particular, such as the clock phase margin of the retiming circuit.

An existing solution commonly used to alleviate the full-rate clock and multiplexed data alignment issue is described in the article by Y. Nakasha et al., entitled "A 43 Gb/s Full-Rate-Clock 4:1 Multiplexer in InP-based HEMT Technology" International Solid-State Circuit Conference Digest, 2002, the disclosure of which is incorporated by reference herein. In this approach, the full-rate clock and/or the multiplexed data stream are delayed (using continuous or discrete delay adjustment elements) for the retiming circuit to operate within its clock phase margin region. But very often, the full-rate clock retiming circuit is already stressing the technology (which is used to implement the circuit) capabilities, and any additional circuitry (used for instance to adjust the clock and multiplexed data alignment) operating at the highest frequency may dramatically reduce the safe operating margins, reduce the overall performance and/or increase the power consumption. Moreover, since the delay elements have a limited delay tuning range, there will be a minimum data rate for which the delay will not cover a whole bit length of the multiplexed data and thus the retiming circuit may not operate within its clock phase margin. Also, the addition of these delay elements may significantly increase the data output jitter. This is especially true when the multiplexed data are delayed because of the pattern dependent jitter.

In view of the forgoing, there is a need for improved techniques which address the issue of final full-rate clock data retiming in a multiplexer circuit, especially when targeting high data rates which are already stressing the maximum frequency capabilities of existing technologies.

SUMMARY OF THE INVENTION

The present invention provides improved techniques for providing full-rate clock data retiming operations. More particularly, the invention provides techniques for selectively adjusting the phase margin of a full-rate clock data retiming circuit to any desired degree value at any data rate. For example, the invention effectively provides for 360° (degree) phase margin full-rate clock data retiming in a time division multiplexer.

In one aspect of the invention, apparatus for use in providing full-rate clock data retiming in a time division multiplexer, wherein the time division multiplexer includes an N to 1 time division multiplexer circuit and a retiming circuit, comprises the following circuitry. The apparatus comprises first circuitry for generating a half-rate clock from a full-rate clock used by the retiming circuit and for providing selective adjustment of a phase associated with the half-rate clock within a range of D degrees. The apparatus further comprises second circuitry, coupled to the first circuitry, for generating a set of sub-rate clocks from the phase-adjustable half-rate clock for use by the N to 1 time division multiplexer circuit in generating a multiplexed data stream from N parallel data streams, such that the retiming circuit is able to operate within a clock phase margin associated therewith.

In accordance with the invention, phase adjustment need not be dependent on a rate associated with the multiplexed data stream. Also, phase adjustment may be continuous or discrete. Preferably, D is 180° and, therefore, the retiming circuit is able to operate effectively with a clock phase margin of 360°. It is to be appreciated that the clock phase margin is an inherent property of the retiming circuit. A retiming circuit with an actual 360° clock phase margin is an ideal retiming circuit, and is thus not physically implementable. However, the invention enables a retiming circuit to effectively (or to virtually) operate with a 360° clock phase margin. Further, in a more general way, the phase adjustment should be large enough such that the data sampling point of the retiming circuit can be set within its inherent clock phase margin. That is, the inherent clock phase margin $CP_m$ of the full-rate clock retiming circuit is effectively extended to the maximum value of 360° if the half-rate clock phase adjustment D is equal to or greater than a value equal to 180° minus $CP_m/2$. Thus, since a practical retiming circuit has an inherent clock phase margin smaller than 360°, the present invention effectively adds, to the clock phase margin, the missing degrees to make the clock phase margin effectively equal to 360°.

In a first illustrative embodiment, the first circuitry may comprise a divide by two circuit for dividing the full-rate clock to generate a first half-rate clock and a second half-rate clock, the first half-rate clock and the second half-rate clock being substantially 90° out of phase with respect to one another.

The first circuitry may further comprise a first exclusive OR gate, coupled to the divide by two circuit, for receiving the first half-rate clock and a first control signal used to invert the polarity of the first half-rate clock; and a second exclusive OR gate, coupled to the divide by two circuit, for receiving the second half-rate clock and a second control signal used to invert the polarity of the second half-rate clock.

The first circuitry may further comprise an interpolator circuit, coupled to the first exclusive OR gate and the second exclusive OR gate, for generating a third half-rate clock from the first half-rate clock and the second half-rate clock received from the first exclusive OR gate and the second exclusive OR gate, respectively, and for adjusting a phase associated with the third half-rate clock, in accordance with a third control signal, within a range substantially equal to the phase difference between the output of the first exclusive OR gate and the output of the second exclusive OR gate. The third half-rate clock generated and adjusted by the interpolator circuit is the phase-adjustable half-rate clock used by the second circuitry to generate the sub-rate clocks.

Further, in accordance with the first control signal and the second control signal, the first exclusive OR gate and the second exclusive OR gate cumulatively serve to one of: (i) invert both the first half-rate clock and the second half-rate clock; (ii) invert neither the first half-rate clock nor the second half-rate clock; and (iii) invert one of the first half-rate clock and the second half-rate clock but not the other. Thus, the interpolator circuit output phase tuning range may be equal to 360° since the output of the first and second exclusive OR gates can be both inverted, both not inverted, or one inverted and one not inverted, and this accomplished simply by adjusting the first and second control bits, respectively.

Accordingly, the third half-rate clock may be used by the second circuitry which generates all the sub-rate clocks required for the N to 1 half-rate clock multiplexer circuit to operate. Consequently, by varying the phase of the third half-rate clock within a 180° range, the phase of the multiplexed data stream is also varied within a 180° range, since the multiplexed data stream is timed using sub-rate clocks derived from the third half-rate clock. Therefore, the full-rate clock retiming circuit is always able to operate within its clock phase margin. Indeed, 180° phase adjustment in the third half-rate clock frequency domain leads to 360° phase adjustment in the full-rate clock frequency domain.

In a second illustrative embodiment, the first circuitry may comprise a divide by two circuit for dividing the full-rate clock to generate M half-rate clocks, wherein a total phase difference associated with the M half-rate clocks is equal to D. The phases associated with the M half-rate clocks may be evenly spaced by D/M degrees.

The first circuitry may further comprise a selector circuit, coupled to the divide by two circuit and responsive to at least one control signal, for selecting one of the M half-rate clocks to be output thereby, such that the phase of the half-rate clock output by the selector circuit is adjustable within a D degree tuning range by D/M degree steps. The half-rate clock output by the selector circuit is the phase-adjustable half-rate clock used by the second circuitry to generate the sub-rate clocks.

In a third illustrative embodiment, the first circuitry may comprise a divide by two circuit for dividing the full-rate clock to generate M half-rate clocks, wherein a total phase difference associated with the M half-rate clocks is equal to D.

The first circuitry may further comprise an interpolator, coupled to the divide by two circuit and responsive to at least one control signal, for generating a half-rate clock from the M half-rate clocks to be output thereby, such that the phase of the half-rate clock output by the interpolator is adjustable within a D degree tuning range. The half-rate clock output by the interpolator is the phase-adjustable half-rate clock used by the second circuitry to generate the sub-rate clocks.

While the invention is not limited to use with any particular retiming circuit, the retiming circuit may be a master-slave data flip-flop.

Advantageously, the inventive techniques address needs identified in the prior art and do not affect the performance or reduce the operating margins of the multiplexer circuit, and their impact on power consumption is very modest. Furthermore, the techniques allow for relaxation of the propagation delay constraints of the half-rate clock multiplexer circuit, itself, which in turn allows for a significant reduction in the overall power consumption.

These and other objects, features and advantages of the present invention will become apparent from the following detailed description of illustrative embodiments thereof, which is to be read in connection with the accompanying drawings.

DESCRIPTION OF THE PREFERRED EMBODIMENTS

As will be illustratively explained in the context of the embodiments presented below, the present invention provides for effectively extending the clock phase margin of a full-rate clock data retiming circuit, used as a final retiming stage in a time division multiplexer circuit, to any desired degree value (preferably 360°) at any data rate. While three illustrative embodiments are described below, it is to be appreciated that other configurations may be employed to implement the principles of the invention. That is, since numerous types of time division multiplexers are known in the art, it is to be understood that the principles of the present invention may be employed with any time division multiplexer using full-rate clock retiming circuit as a final data retiming circuit, and whose sub-rate clocks, used to perform the data multiplexing operation, are derived from the full-rate clock used in the final data retiming circuit.

Figure 1:
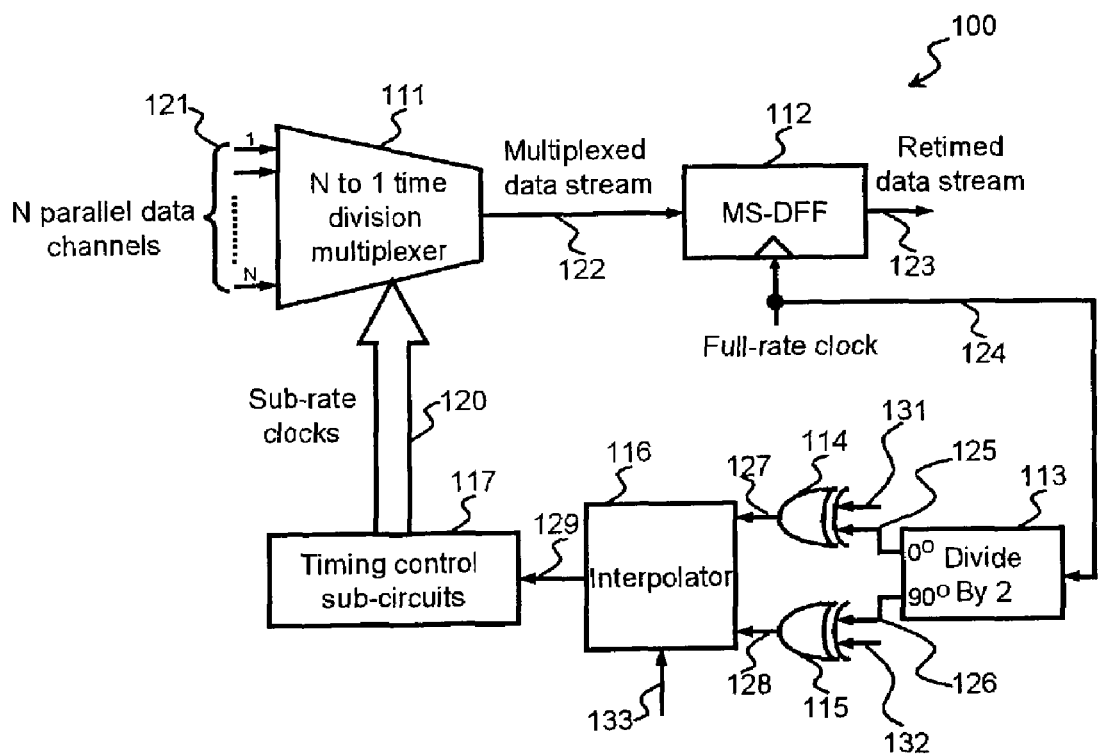
FIG. 1 is a block diagram illustrating an N to 1 time division multiplexer in accordance with a first embodiment of the present invention.

Referring initially to FIG. 1, a block diagram illustrates an N to 1 time division multiplexer in accordance with a first embodiment of the present invention. More particularly, FIG. 1 illustrates a time division multiplexer 100 using a full-rate clock retiming circuit as a final stage in accordance with a preferred embodiment of the present invention. As will be evident in accordance with this illustrative embodiment, the principles of the invention effectively allow for extension of the clock phase margin of the full-rate retiming circuit to 360°.

As shown, N parallel NRZ data channels 121 are received in an N to 1 time division multiplexer circuit 111. Such an N to 1 time division multiplexer circuit is well known in the art. The signal 122 present at the output of the N to 1 time division multiplexer circuit 111 corresponds to the multiplexed data stream, which is then sampled and retimed by a master-slave data flip-flop (MS-DFF) circuit 112. Such an MS-DFF is well known in the art. However, retiming circuits other than an MS-DFF may be employed. The MS-DFF 112 uses a sampling clock 124 referred to as the full-rate clock. The full-rate clock may be generated by any suitable clock generation circuit known in the art (not shown). The full-rate clock 124 frequency is equal to the multiplexed data stream 122 rate. The signal 123 present at the output of the MS-DFF 112 is referred to as the retimed data stream and is identical to the multiplexed data stream 122.

Further, as shown, the full-rate clock 124 is applied to the input of a divide by two circuit 113 which generates first and second clock signals 125 and 126. The frequency of the clock signals 125 and 126 is thus equal to half the rate of the multiplexed data stream 122. Clock signals 125 and 126 are referred to as half-rate clock signals. The first half-rate clock 125 phase is leading the second half-rate clock 126 phase by 90°. Such a divide by two circuit, generating quadrature divided by two clocks, is known as a quadrature divide by two circuit. The divide by two circuit may be commonly implemented using a toggle flip-flop.

The first and second half-rate clocks 125 and 126 are exclusively logically ORed (XORed) with first and second DC (direct current) control signals (bits) 131 and 132, respectively, using first and second XOR gates 114 and 115, respectively. The first and second DC control signals 131 and 132 serve to invert the outputs of the first and second XOR gates 114 and 115, respectively.

The half-rate clock 127 present at the output of the first XOR gate 114 and the half-rate clock 128 present at the output of the second XOR gate 115 are applied to an interpolator circuit 116. Such an interpolator circuit is well known in the art. The interpolator generates a third half-rate clock 129. The phase of the third half-rate clock 129 is continuously varied, by adjusting a third DC control signal (bit) 133, within a phase tuning range equal to the difference between the phase of the half-rate clock 127 and the phase of the half-rate clock 128. By inverting one of the DC control signals 131 and 132, the phase adjustment of the third half-rate clock 129 is extended to a 180° tuning range.

The third half-rate clock 129 is processed by timing control sub-circuits 117 which generate the set of required timing clock signals 120 for clocking the N to 1 time division multiplexer 111. Such timing control sub-circuits are well known in the art.

By varying the phase of the third half-rate clock 129 by D degrees, the phase of the multiplexed data stream 122 is also varied by D degrees. Consequently, the time alignment of the full-rate clock 124 and the multiplexed data stream 122 can be adjusted in such a way that the MS-DFF 112 always operates within its clock phase margin. That is, 180° phase adjustment in the half-rate clocks frequency domain leads to 360° phase adjustment in the full-rate clock frequency domain. This is equivalent to using a 360° clock phase margin full-rate clock retiming circuit. The amount of phase adjustment is achieved at any frequency and consequently is not dependent on the multiplexed data rate.

As will be described below, in alternative embodiments of the present invention, the time alignment of the full-rate clock 124 and the multiplexed data stream 122 may be adjusted in a continuous way or using discrete steps within any given range at any multiplexed data rate.

Figure 2:
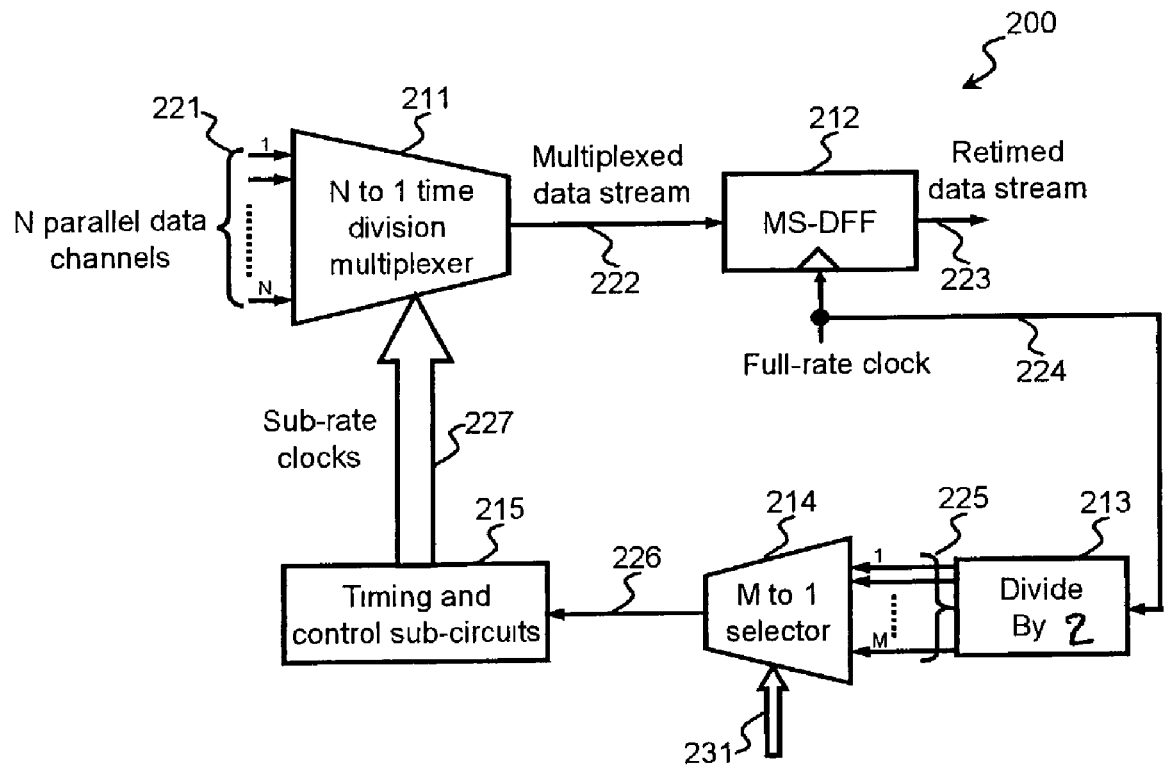
FIG. 2 is a block diagram illustrating an N to 1 time division multiplexer in accordance with a second embodiment of the present invention.

Referring now to FIG. 2, a block diagram illustrates an N to 1 time division multiplexer in accordance with a second embodiment of the present invention. More particularly, FIG. 2 illustrates a time division multiplexer 200 using a full-rate clock retiming circuit as a final stage in accordance an alternative embodiment of the present invention. As will be evident in accordance with this illustrative embodiment, the principles of the invention effectively allow for selective adjustment of the clock phase margin of the full-rate retiming circuit to any value using discrete steps.

As shown, N parallel NRZ data channels 221 are received in an N to 1 time division multiplexer circuit 211. Such an N to 1 time division multiplexer circuit is well known in the art. The signal 222 present at the output of the N to 1 time division multiplexer circuit 211 corresponds to the multiplexed data stream, which is then sampled and retimed by a master-slave data flip-flop (MS-DFF) circuit 212. Such an MS-DFF is well known in the art. However, retiming circuits other than an MS-DFF may be employed. The MS-DFF 212 uses a sampling clock 224 referred to as the full-rate clock. The full-rate clock may be generated by any suitable clock generation circuit known in the art (not shown). The full-rate clock 224 frequency is equal to the multiplexed data stream 222 rate. The signal 223 present at the output of the MS-DFF 212 is referred to as the retimed data stream and is identical to the multiplexed data stream 222.

Further, as shown, the full-rate clock 224 is applied to the input of a divide by two circuit 213 which generates a set of M clock signals 225. Any suitable divide by two circuit known in the art may be employed. By way of example only, a differential toggle flip-flop which generates four half-rate clocks having the same frequency but four different phases (e.g., 0, 90, 180 and 270 degrees) may be used.

In any case, the frequency of the M clock signals set 225 is equal to half the rate of the multiplexed data stream 222. Clock signals set 225 is referred to as the set of half-rate clocks 225. The phases of these clocks are preferably evenly spaced by D/M degrees, where D is the phase difference between the first half-rate clock signal and the last half-rate clock signal forming the half-rate clocks set 225. However, it is to be understood that the M half-rate clocks do not have to be evenly spaced, e.g., they may be unevenly spaced.

The half-rate clocks set 225 is applied to the inputs of an M to 1 selector 214, which is digitally controlled by DC control signals 231. It is to be appreciated that the DC control signals 231 are preferably in the form of control bits. As is known, such control bits may be used to select one of the inputs of the selector 214 to be transferred to its output. Any suitable selector known in the art may be employed. Thus, the DC control signals 231 define which of the inputs of the M to 1 selector 214 is transferred to its output, the output being the half-rate clock 226. In other words, the DC control signals 231 allow modification of the phase of the half-rate clock 226 present at the output of the M to 1 selector 214, up to D degrees (i.e., within a D degree tuning range) by D/M degree steps.

The half-rate clock 226 is processed by timing control sub-circuits 215, which generate the set of required timing signals 227 for clocking the N to 1 time division multiplexer 211. Such timing control sub-circuits are well known in the art.

By stepping the phase of the half-rate clock 226 by D/M degrees, the phase of the multiplexed data stream 222 is also varied by D/M degree steps. Consequently, the time alignment of the full-rate clock 224 and the multiplexed data stream 222 may be adjusted by D/M degree steps, within a D degree tuning range, in such a way that the MS-DFF 212 always operates within its clock phase margin. Advantageously, the amount of phase adjustment D, in degrees, is achieved at any frequency, and consequently is not dependent on the multiplexed data rate.

Figure 3:
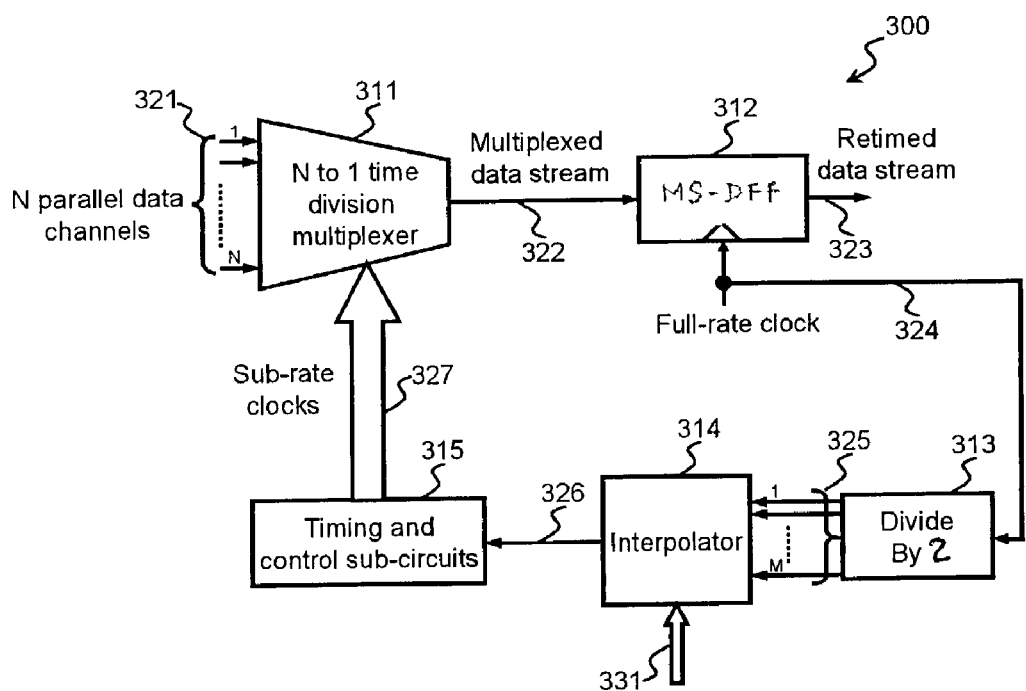
FIG. 3 is a block diagram illustrating an N to 1 time division multiplexer in accordance with a third embodiment of the present invention.

Referring lastly to FIG. 3, a block diagram illustrates an N to 1 time division multiplexer in accordance with a third embodiment of the present invention. More particularly, FIG. 3 illustrates a time division multiplexer 300 using a full-rate clock retiming circuit as a final stage in accordance an alternative embodiment of the present invention. As will be evident in accordance with this illustrative embodiment, the principles of the invention effectively allow for selective adjustment of the clock phase margin of the full-rate retiming circuit to any degree.

As shown, N parallel NRZ data channels 321 are received in an N to 1 time division multiplexer circuit 311. Such an N to 1 time division multiplexer circuit is well known in the art. The signal 322 present at the output of the N to 1 time division multiplexer circuit 311 corresponds to the multiplexed data stream, which is then sampled and retimed by a master-slave data flip-flop (MS-DFF) circuit 312. Such an MS-DFF is well known in the art. However, retiming circuits other than an MS-DFF may be employed. The MS-DFF 312 uses a sampling clock 324 referred to as the full-rate clock. The full-rate clock may be generated by any suitable clock generation circuit known in the art (not shown). The full-rate clock 324 frequency is equal to the multiplexed data stream 322 rate. The signal 323 present at the output of the MS-DFF 312 is referred to as the retimed data stream and is identical to the multiplexed data stream 322.

Further, as shown, the full-rate clock 324 is applied to the input of a divide by two circuit 313 which generates a set of M clock signals 325. Any suitable divide by two circuit known in the art may be employed. The frequency of the clock signals set 325 is thus equal to half the rate of the multiplexed data stream 322. Clock signals set 325 is referred to as half-rate clocks set 325. The total phase difference between the half-rate clocks set 325 is equal to D degrees.

The half-rate clocks set 325 is applied to the inputs of an interpolator 314, which is controlled by a set of DC control signals 331. Again, such control signals are preferably in the form of control bits. As is known, such control bits may be used to generate the interpolator output given the interpolator inputs. Any suitable interpolator known in the art may be employed. This interpolator generates a half-rate clock 326. The phase of the half-rate clock 326 is varied, continuously or by discrete steps, within a D degree tuning range using the DC control signals set 331.

The half-rate clock 326 is processed by timing control sub-circuits 315, which generate the set of required timing signals for clocking the N to 1 time division multiplexer 311. Such timing control sub-circuits are well known in the art.

By changing the phase of the half-rate clock 326 by a given amount k, continuously or by discrete steps, within a D degree tuning range, the phase of the multiplexed data stream 322 is also changed by the same amount k, within a D degree tuning range. Consequently, the alignment of the full-rate clock 324 and the multiplexed data stream 322 may be adjusted by any amount k, within a D degree tuning range, in such a way that the retiming circuit 312 always operates within its clock phase margin. Advantageously, the amount of phase adjustment D, in degrees, is achieved at any frequency, and consequently is not dependent on the multiplexed data rate.

It is to be understood that the phase adjustment control bits (signals) referred to in the above embodiments may be externally set via a manual technique or an automatic technique. The invention is not intended to be limited to any particular means for setting such bits.

It is to be further understood that all or a portion of the functional elements of time division multiplexers formed according to the invention (e.g., as described above in the context of FIGS. 1, 2 and 3) may be implemented, by way of example and without limitation, utilizing one or more microprocessors, central processing units (CPU), digital signal processors (DSP), application-specific integrated circuits (ASIC), or other types of data processing devices or processing circuitry, as well as portions and combinations of these and other devices or circuitry. Thus, the term "circuitry," as used herein, is intended to generally encompass the above exemplary implementations (e.g., CPU, DSP, ASIC, etc.), as well as all equivalents.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. Apparatus for use in providing full-rate clock data retiming in a time division multiplexer, wherein the time division multiplexer includes an N to 1 time division multiplexer circuit and a retiming circuit, the apparatus comprising:
- first circuitry for generating a half-rate clock from a full-rate clock used by the retiming circuit and for providing selective adjustment of a phase associated with the half-rate clock within a range of D degrees; and
- second circuitry, coupled to the first circuitry, for generating a set of sub-rate clocks from the phase-adjustable half-rate clock for use by the N to 1 time division multiplexer circuit in generating a multiplexed data stream from N parallel data streams, such that the retiming circuit is able to operate within a clock phase margin associated therewith.

2. The apparatus of claim 1, wherein phase adjustment is not dependent on a rate associated with the multiplexed data stream.

3. The apparatus of claim 1, wherein D is 180 degrees.

4. The apparatus of claim 1, wherein phase adjustment is one of continuous and discrete.

5. The apparatus of claim 1, wherein the first circuitry comprises a divide by two circuit for dividing the full-rate clock to generate a first half-rate clock and a second half-rate clock, the first half-rate clock and the second half-rate clock being substantially 90 degrees out of phase with respect to one another.

6. The apparatus of claim 5, wherein the first circuitry further comprises:
- a first exclusive OR gate, coupled to the divide by two circuit, for receiving the first half-rate clock and a first control signal used to invert the polarity of the first half-rate clock; and
- a second exclusive OR gate, coupled to the divide by two circuit, for receiving the second half-rate clock and a second control signal used to invert the polarity of the second half-rate clock.

7. The apparatus of claim 6, wherein the first circuitry further comprises:
- an interpolator circuit, coupled to the first exclusive OR gate and the second exclusive OR gate, for generating a third half-rate clock from the first half-rate clock and the second half-rate clock received from the first exclusive OR gate and the second exclusive OR gate, respectively, and for adjusting a phase associated with the third half-rate clock, in accordance with a third control signal, within a range substantially equal to a phase difference between an output of the first exclusive OR gate and an output of the second exclusive OR gate;
- wherein the third half-rate clock generated and adjusted by the interpolator circuit is the phase-adjustable half-rate clock used by the second circuitry to generate the sub-rate clocks.

8. The apparatus of claim 7, wherein, in accordance with the first control signal and the second control signal, the first exclusive OR gate and the second exclusive OR gate cumulatively serve to one of: (i) invert both the first half-rate clock and the second half-rate clock; (ii) invert neither the first half-rate clock nor the second half-rate clock; and (iii) invert one of the first half-rate clock and the second half-rate clock but not the other.

9. The apparatus of claim 1, wherein the first circuitry comprises a divide by two circuit for dividing the full-rate clock to generate M half-rate clocks, wherein a total phase difference associated with the M half-rate clocks is equal to D degrees.

10. The apparatus of claim 9, wherein the phases associated with the M half-rate clocks are evenly spaced by D/M degrees.

11. The apparatus of claim 9, wherein the first circuitry further comprises:
- a selector circuit, coupled to the divide by two circuit and responsive to at least one control signal, for selecting one of the M half-rate clocks to be output thereby, such that the phase of the half-rate clock output by the selector circuit is adjustable within a D degree tuning range by D/M degree steps;
- wherein the half-rate clock output by the selector circuit is the phase-adjustable half-rate clock used by the second circuitry to generate the sub-rate clocks.

12. The apparatus of claim 9, wherein the first circuitry further comprises:
- an interpolator, coupled to the divide by two circuit and responsive to at least one control signal, for generating a half-rate clock from the M half-rate clocks to be output thereby, such that the phase of the half-rate clock output by the interpolator is adjustable within a D degree tuning range;
- wherein the half-rate clock output by the interpolator is the phase-adjustable half-rate clock used by the second circuitry to generate the sub-rate clocks.

13. The apparatus of claim 1, wherein the retiming circuit is a master-slave data flip-flop.

14. A method of providing full-rate clock data retiming in a time division multiplexer, wherein the time division multiplexer includes an N to 1 time division multiplexer circuit and a retiming circuit, the method comprising:
- generating a half-rate clock from a full-rate clock used by the retiming circuit and providing selective adjustment of a phase associated with the half-rate clock within a range of D degrees; and
- generating a set of sub-rate clocks from the phase-adjustable half-rate clock for use by the N to 1 time division multiplexer circuit in generating a multiplexed data stream from N parallel data streams, such that the retiming circuit is able to operate within a clock phase margin associated therewith.

15. The method of claim 14, wherein phase adjustment is not dependent on a rate associated with the multiplexed data stream.

16. The method of claim 14, wherein D is 180 degrees.

17. The method of claim 14, wherein phase adjustment is one of continuous and discrete.

18. Apparatus for use in providing full-rate clock data retiming in a time division multiplexer, wherein the time division multiplexer includes an N to 1 time division multiplexer circuit and a retiming circuit, the apparatus comprising:
- at least one processor operative to: (i) generate a half-rate clock from a full-rate clock used by the retiming circuit and provide selective adjustment of a phase associated with the half-rate clock within a range of D degrees; and (ii) generate a set of sub-rate clocks from the phase-adjustable half-rate clock for use by the N to 1 time division multiplexer circuit in generating a multiplexed data stream from N parallel data streams, such that the retiming circuit is able to operate within a clock phase margin associated therewith.

19. The apparatus of claim 18, wherein phase adjustment is not dependent on a rate associated with the multiplexed data stream.

20. The apparatus of claim 18, wherein D is 180 degrees.

21. The apparatus of claim 18, wherein phase adjustment is one of continuous and discrete.

22. A time division multiplexer, comprising:

an N to 1 time division multiplexer circuit;

a full-rate clock data retiming circuit coupled to the output of the N to 1 time division multiplexer circuit; and circuitry, coupled to the N to 1 time division multiplexer circuit and the full-rate clock data retiming circuit, operative to: (i) generate a half-rate clock from a full-rate clock used by the retiming circuit and provide selective adjustment of a phase associated with the half-rate clock within a range of D degrees; and (ii) generate a set of sub-rate clocks from the phase-adjustable half-rate clock for use by the N to 1 time division multiplexer circuit in generating a multiplexed data stream from N parallel data streams, such that the full-rate clock data retiming circuit is able to operate within a clock phase margin associated therewith.

23. The time division multiplexer of claim 22, wherein phase adjustment is not dependent on a rate associated with the multiplexed data stream.

24. The time division multiplexer of claim 22, wherein D is 180 degrees.

25. The time division multiplexer of claim 22, wherein phase adjustment is one of continuous and discrete.

26. Apparatus for use in providing full-rate clock data retiming in a time division multiplexer, wherein the time division multiplexer includes an N to 1 time division multiplexer circuit and a retiming circuit, the apparatus comprising:

first circuitry for generating a half-rate clock from a full-rate clock used by the retiming circuit and for providing selective adjustment of a phase associated with the half-rate clock within a range of 180 degrees; and second circuitry, coupled to the first circuitry, for generating a set of sub-rate clocks from the phase-adjustable half-rate clock for use by the N to 1 time division multiplexer circuit in generating a multiplexed data stream from N parallel data streams, such that the retiming circuit is effectively able to operate with a clock phase margin of 360 degrees.

27. Apparatus for use in providing full-rate clock data retiming in a time division multiplexer, wherein the time division multiplexer includes an N to 1 time division multiplexer circuit and a retiming circuit, the apparatus comprising:

means for generating a half-rate clock from a full-rate clock used by the retiming circuit and for providing selective adjustment of a phase associated with the half-rate clock within a range of D degrees; and means, coupled to the half-rate clock generating means, for generating a set of sub-rate clocks from the phase-adjustable half-rate clock for use by the N to 1 time division multiplexer circuit in generating a multiplexed data stream from N parallel data streams, such that the retiming circuit is able to operate within a clock phase margin associated therewith.

* * * * *